United States Patent [19]

Gardner

[11] Patent Number: 4,878,443
[45] Date of Patent: Nov. 7, 1989

[54] PLANTER TRASH GUARD

[76] Inventor: Donald Gardner, Rt. 1, Box 5, St. Peter, Minn. 56082

[21] Appl. No.: 223,082

[22] Filed: Jul. 22, 1988

[51] Int. Cl.$^4$ .............................................. A01C 5/06
[52] U.S. Cl. .................................. 111/141; 111/195; 172/538; 172/606
[58] Field of Search ................... 111/85, 52, 88; 172/509, 562, 566, 538, 606, 156, 27, 568, 560, 558, 508, 561, 514, 517

[56] References Cited

U.S. PATENT DOCUMENTS

| | | | |
|---|---|---|---|
| 933,977 | 9/1909 | Green | 172/509 |
| 1,076,998 | 10/1913 | Rieske | 111/88 |
| 1,106,278 | 8/1914 | Brumfield | 172/509 |
| 1,203,156 | 10/1916 | Sturrock | 172/566 |
| 1,834,485 | 12/1931 | Bissell | 172/562 |
| 2,540,262 | 2/1951 | Higginson | 111/88 |
| 2,924,189 | 2/1960 | McLeod | 111/85 |
| 4,117,893 | 10/1978 | Kinzenbaw | 111/85 |

OTHER PUBLICATIONS

"Drawn, Integral and Unit Planters" John Deere promotional brochure cited by Applicant.

Primary Examiner—Danton D. DeMille
Attorney, Agent, or Firm—Douglas L. Tschida

[57] ABSTRACT

A formed metal guard mountable to a planter framework to prevent clogging or blockage of furrow closure means. In a particular embodiment, a trapezoidal guard plate vertically extends forward of and in centered relation to a pair of V-mounted furrow closure wheels.

6 Claims, 3 Drawing Sheets

PLANTER TRASH GUARD

BACKGROUND OF THE INVENTION

The present invention relates to commercial seed planters and, in particular, to a guard member useful therewith for preventing blockage of the furrow presser or closure wheels when re-planting minimum tillage fields or other soils containing a variety of surface debris.

With the advent of gasoline shortages, minimum tillage practices have become more popular in the farm industry. Although some deficiencies in crop yield may result, generally, this is offset by cost savings in labor, fuel consumption and the like, as well as various other documented advantages of soil and moisture retention.

One particular cause of reduced yield experienced during the planting season is that the furrow closure means of the planter occasionally becomes blocked with surface debris, resulting in non-germinating seeds or seed loss with subsequent blowing and water run-off. These symptoms occur with greater frequency in minimum tillage and rocky soils, than with soils prepared using traditional tillage practices. Specifically corn stalks, rocks and the like may intermittently or continuously block one or more presser wheel pairs of a multi-row planter which condition may go undetected by the farm operator for a period of time before he/she is able to free the debris.

One type of planter particularly experiencing the foregoing blockage problems are those which utilize a pair of V-mounted presser wheels for closing the furrow, once planted. Two planter brands utilizing such wheels of which Applicant is aware are those manufactured by the John Deere TM and Kinze Manufacturing Companies. For these planters, blockage results in improper seed placement and/or furrow closure failure and consequent non-germination of the planted seed.

Although too, John Deere does provide disk and V-wing attachments for clearing the soil surface prior to furrow preparation, they have not been found to overcome the mentioned problem.

SUMMARY OF INVENTION

As a solution to the foregoing problem, and after having determined the unavailability of any equivalent or counterpart device, Applicant has developed a guard for steering surface debris away from the presser wheels or furrow closure means of a planter.

It is accordingly a primary object of the present invention to provide a guard usable with planters for preventing improper furrow closure.

It is a further object of the present invention to provide a guard which mounts in non-obstructive relation to normal planter operation and directs the debris outwardly and away from the prepared furrow.

It is a further object of the invention to provide a guard including adjustment means for adapting the guard to a variety of planter constructions.

Various of the foregoing objects and disadvantages are particularly achieved with the presently preferred guard which was designed to mount to a variety of planters including V-shaped furrow closure or presser wheels. Generally, the present guard comprises a pyramidal shaped deflector guard plate which is suspended in front of and in equi-distant relation between a pair of V-shaped furrow closure wheels. A vertical support portion provides proper height separation and a slotted horizontal support portion permits non-rotative fore and aft adjustment of the guard relative to the planter framework.

In alternatively considered embodiments, the vertical member is extensibly adjustable to accommodate various other planters. The deflector shape may also be varied relative to the planter to provide for proper deflection.

The foregoing objects, advantages and distinctions of the invention, among others, as well as its detailed construction will become more apparent hereinafter upon reference to the following description with respect to the appended drawings. Before referring thereto, it is to be appreciated the following description is made by way of the presently preferred embodiment only, with suitable mention being made to variously considered improvements and modification thereto. The following description should however not be interpreted in limitation of the spirit and scope of the invention as claimed hereinafter.

DESCRIPTION OF THE PREFERRED EMBODIMENT

Figure 1:
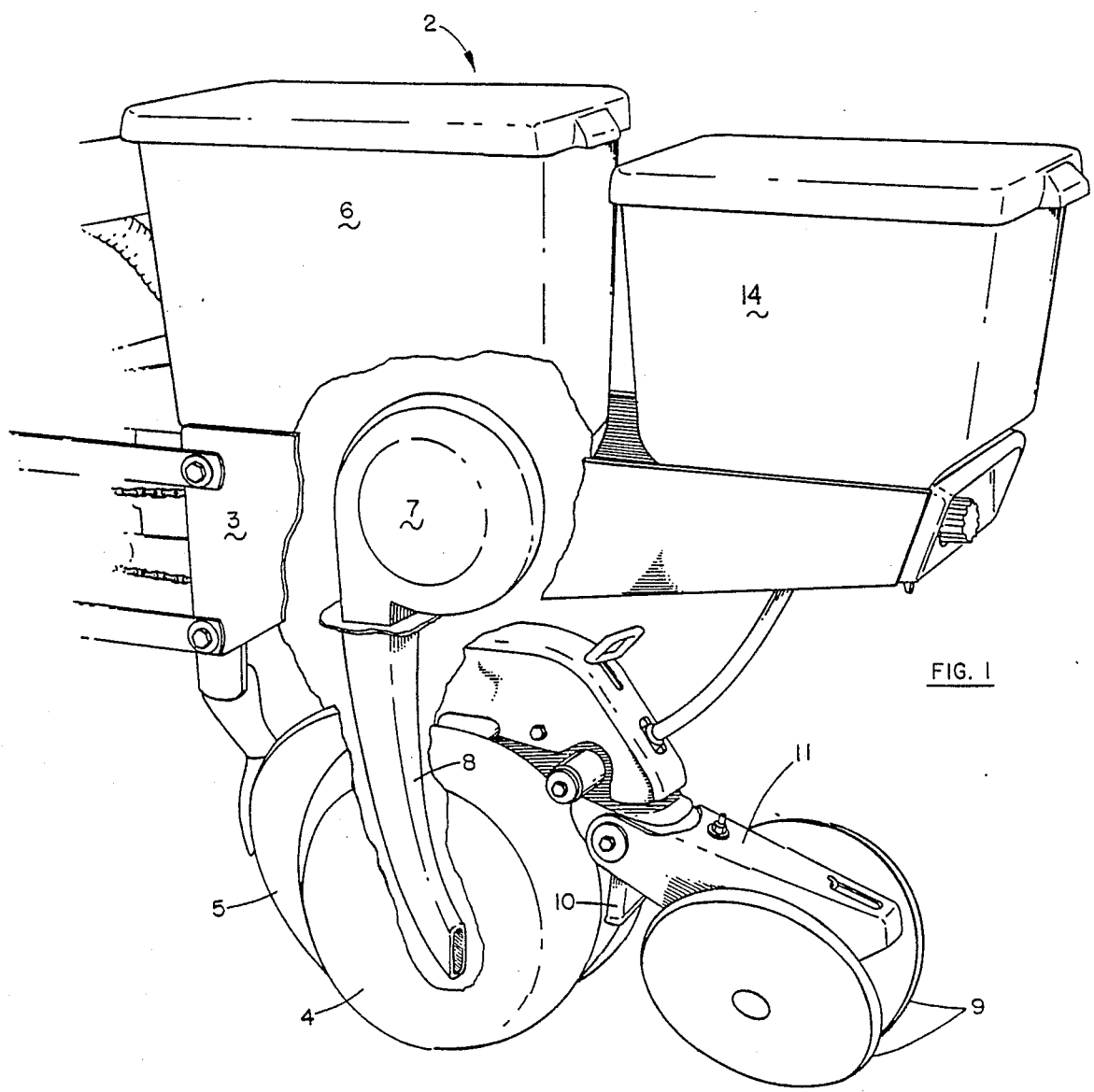
FIG. 1 shows an isometric view of a portion of a planter which may advantageously use the invention.

Referring to FIG. 1, an isometric assembly view is shown of a single furrow planting portion 2 of a multi-row planter such as manufactured by the John Deere Company and wherein the present invention has been incorporated. Specific information regarding such planters might be obtained upon contacting the manufacturers for available information, such as relating to the John Deere, model 7000 planters.

Generally, however, each planter portion 2 provides for a trailered frame 3 which is supported via a pair of guage wheels 4 (only one wheel of which is shown) a set height above the soil. A pair of V-mounted disk wheels 5 which mount forward of the guage wheels 4 score the soil to prepare a V-shaped furrow to the proper depth. Otherwise, a seed containing hopper 6 mounted along the upper surface of the frame 3 distributes the seed to a metered pickup unit 7 which transfers the individual seeds to a distribution tube 8. The tube 8 directs the seed into the prepared furrow. Proper seed spacing is obtained by appropriately varying the speed of the towing vehicle and/or an intermediate transmission unit (not shown) with greater/lesser spacing being obtained with slower/faster meter unit 7 speeds.

After depositing the seed, fertilizer and the like may be distributed from a second frame 3 mounted hopper 14 via an outlet port 10. As the seed is deposited, a pair of separately trailed and following, V-mounted presser wheels 9 are aligned to push the ridged soil on each side of the furrow back into the furrow and slightly tamp the soil with the wheel action and weight. A spring 12 mounted between the frame 3 and a trailer boom 11 supporting the presser wheels 14 maintains wheel contact with the soil.

Once therefore initially tilled, which may be accomplished with forwardly mounted coulters and other planter attachments, the soil may be planted in a single operation, with the seed later germinating and sprouting from the prepared furrows.

Whereas in the past, most farm fields were prepared for planting by plowing and multiple disking operations to obtain a fine soil consistency, very little difficulties were encountered during the planting operation, except for the occasional stone which obstructed the presser wheels 9. However, with the increasing popularity of minimum tillage practices, greater amounts of potential obstructions are present in the prepared soil, along with the otherwise existing rock, dirt clumps, etc. The higher prevalence of such obstructions more often than not leads to a greater frequency of blockage of the space between the presser wheels with a consequent failure to close over the furrows. The planted seed is, in turn, exposed to surface wind and water conditions and may either be blown or washed away prior to germination. Either bare patches or uncontrolled clustering of crops may in turn occur with consequent reduced yield.

Figure 2:
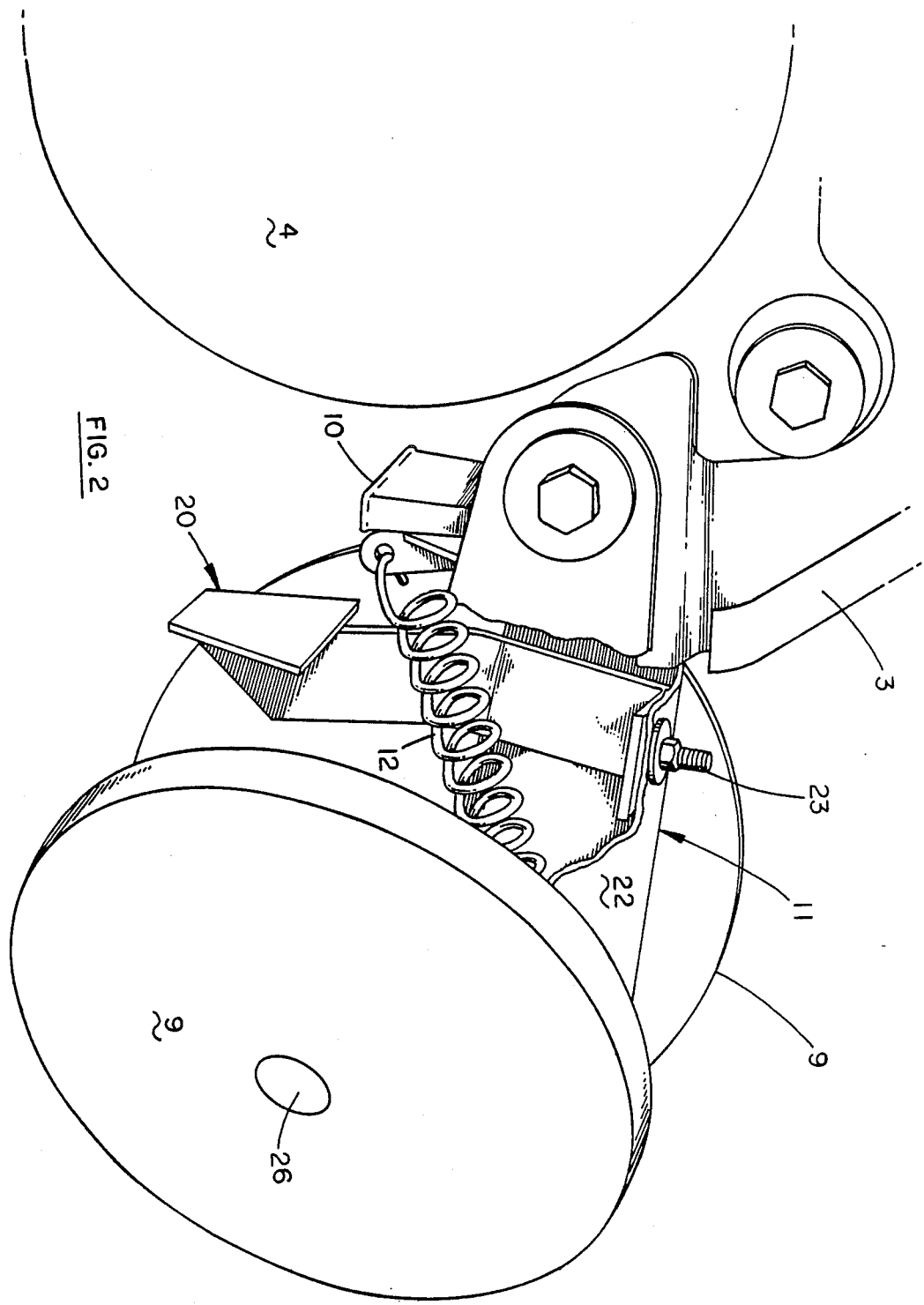
FIG. 2 shows a detailed isometric view of the present guard in mounted relation to the furrow closure wheels of the planter in FIG. 1.
Figure 3:
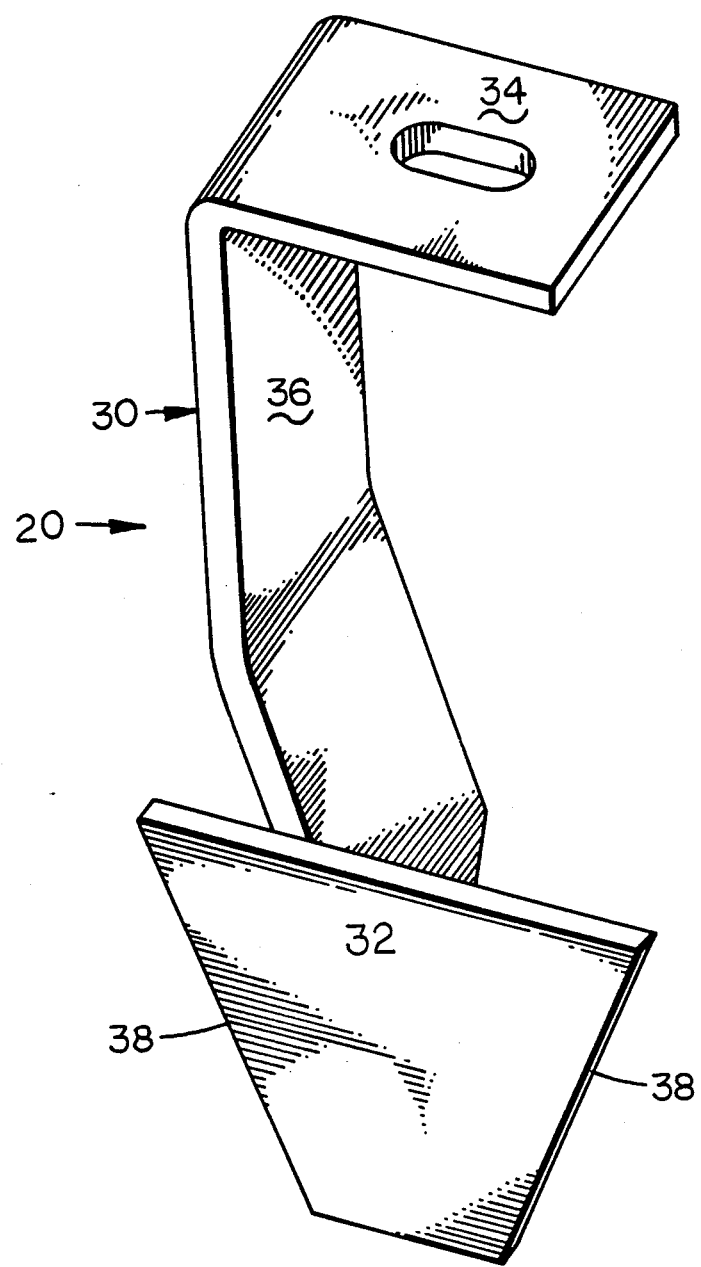
FIG. 3 shows an isometric view of the present guard, removed from the planter.

Referring to FIG. 2 and 3 and in an effort to alleviate and prevent the foregoing problems, Applicant has developed a shield or guard member 20 shown in detail in FIG. 3 which mounts between and in front of each of the pairs of a planter's presser wheels 9 as shown in FIG. 2 to divert any encountered surface debris outward and away from the presser wheels 9. Proper furrow closure is thus obtained.

Referring to FIG. 2, a detailed assembly view is shown of one of the guards 20 of the present invention in its typical mounted relation to the pair of presser wheels 9 and the trailer boom 11. Each boom 11 pivotally mounts under spring tension to the frame 3 and between which extends the spring 12 (shown in cutaway). The trailer or stub boom 11 particularly comprises an inverted U-shaped channel member 22. The channel member 22 at is forward end is bolted to the frame 3 adjacent the fertilizer distribution port 10 for that furrow.

Extending through holes formed in the side walls of the channel member 22 is an appropriately-shaped axle 26, the sides of which are welded to the channel member 22. Rotatively mounted on the right and left ends of the axle 26 in alignment to one another are a pair of rubber-surfaced presser wheels 9 which commonly are 13-15 inches in diameter. The wheels at their apex are spaced apart approximately 3-5 inches which during planting and relative to the weight of the boom 11, induces the wheels 9 to be depressed slightly into the soil. The alignment of the wheels to one another is also such that as the wheels roll forward, each directs encountered soil inwardly to cover the deposited seed. A concurrent pinching action via the spring loading and the weight of the presser wheels 9 provides the mentioned tamping to firmly hold the furrows and allow for proper seed germination.

Bolted to the fore-end of the channel 22 via a bolt/nut fastener 23 is the guard 20 of the present invention. It is secured at its upper end in non-rotative relation to the channel 22 and vertically extends downward with the outer side edges of a lower deflection shield portion mounting in parallel alignment to the presser wheels 9.

The guard 20 is particularly comprised of a vertical support arm 30 and to a lower end of which is mounted a trapezoidally shaped deflector or guard plate 32. The support arm 30 generally includes a flat, bored upper horizontal portion 34 and a vertically extending portion 36. The vertical portion 36 is bent inward or offset slightly to better center the support relative to the deflector plate 32 which is welded to a forward edge of the support 30.

At present, the guard 20 is constructed of ¼ inch by 2 inch flat mild steel stock which on edge provides suitable rigidity for the intended purpose. The width of the horizontal portion 34 is sized to mount within the boom channel to minimize possible twisting during use. Such a mounting also does away with the necessity of multiple bolt/nut fasteners 23. it is to be appreciated further that the hole at the fastener 23 might be slotted as in FIG. 3 to permit adjusting the fore/aft position of the guard 20 relative to the channel 22.

As depicted, the guard plate 32 is configured in a trapezoidal or an inverted pyramidal shape having a flattened apex. Such a shape aligns the outer edges 38 with the presser wheels 9 so as not to contact either wheel and essentially blocks the space between the wheels, heretofor otherwise unprotected against blockage from corn stalks, dirt clods, etc.

Numerous other flat, two-dimensional or plow shapes might however alternatively be used, depending upon the configuration of the presser wheels and/or other furrowclosing assembly used with the planter. For example, the edges of the guard plate might also be formed to extend beyond the sides of the presser wheels and possibly bend rearward to completely enshroud the opening. In practice however, the shape shown has been found to yield suitable results without the additionally required forming operations for a more elaborate construction.

While the present invention has been described with respect to its presently preferred embodiment and various alternative constructions, it is to be appreciated still other constructions might be suggested to those of skill and the art. Accordingly, it is contemplated that the following claims should be interpreted to include all those equivalent embodiments within the spirit and scope thereof.

What is claimed is:

1. A surface debris deflector for soil tillage apparatus including at least one pair of disk member cooperatively mounted in spaced apart relation to one another to rotate on edge as said apparatus travels over the soil, said debris deflector comprising:
   (a) a planar body portion having side edges which vertically align in substantially parallel relation to an edge profile exhibited by said disk members relative to a line of apparatus travel over the soil; and
   (b) a vertical support portion including means for mounting said body portion in centered relation to said disk members and to suspend said body portion immediately above the soil and forward of the rotational axis of said pair of disk members such that surface debris encountered by said body portion is prevented from entering the space between said disk members.

2. Apparatus as set forth in claim 1 wherein said planar portion includes parallel upper and lower horizontal edges joined by downwardly converging adjoining side edges.

3. Soil tillage apparatus having at least one pair of disk members cooperatively mounted in spaced apart relation to one another to present a V-shaped profile when viewed end-on in relation to a line of apparatus travel over the soil and to rotate upon engaging the soil and further including:

(a) a support member having a horizontal leg portion including at least one mounting aperture and a downwardly projecting vertical leg portion;

(b) a deflector member having downwardly converging side edges secured to said vertical leg portion and mounted to said soil tillage apparatus in suspended relation immediately adjacent the soil surface and forwardly of the rotational axis of said pair of disk members such that, when viewed end-on, the side edges align in substantial, vertically parallel relation to said disk members to prevent surface debris from entering the space between said disk members as said apparatus travels forward.

4. Farm planting apparatus comprising:

(a) trailered planting means including a plurality of support wheels and means for preparing at least one seed receiving furrow in the soil and means for depositing seed therein;

(b) at least one pair of spring-biased V-mounted wheels following said furrow preparing and seed deposition means for closing the seed furrow; and (c) a deflector member having downwardly converging side edges mounted to said planting apparatus in suspension above the soil and in centered leading relation between said V-mounted wheels to deflect surface debris away from the space between said wheels.

5. Apparatus as set forth in claim 4 wherein said deflector member comprises a planar member having parallel upper and lower horizontal edges and downwardly converging adjoining side edges.

6. Apparatus as set forth in claim 5 wherein said horizontal portion includes at least one slotted channel.

* * * * *